United States Patent [19]

Dongelmans

[11] 4,430,002
[45] Feb. 7, 1984

[54] DOOR-OPERATING MECHANISM

[75] Inventor: Anthony A. Dongelmans, Hacienda Heights, Calif.

[73] Assignee: Challenge-Cook Brothers, Inc., City of Industry, Calif.

[21] Appl. No.: 243,694

[22] Filed: Mar. 16, 1981

[51] Int. Cl.³ ............................................. B01F 13/06
[52] U.S. Cl. ...................................... 366/139; 220/211
[58] Field of Search ............................ 366/139, 57–59, 366/54, 135, 163, 191, 220, 225, 232, 233, 39, 2–8, 14, 30, 36, 606; 220/244, 260, 314, 211, 329, 337; 34/92

[56] References Cited

U.S. PATENT DOCUMENTS

| | | | |
|---|---|---|---|
| 2,628,080 | 2/1953 | Mack | 366/139 |
| 2,838,392 | 6/1958 | Bielawski | 366/139 |
| 3,144,165 | 8/1964 | Pegon | 220/211 |
| 3,161,403 | 12/1964 | Lincoln et al. | |
| 3,175,811 | 3/1965 | Jackson | |
| 3,279,763 | 10/1966 | Seman | 366/39 |
| 3,518,849 | 7/1970 | Eggleston | |
| 3,665,735 | 5/1972 | Brennan | |
| 3,746,316 | 7/1973 | Langen et al. | |
| 3,803,882 | 4/1974 | Brennan | |
| 3,880,067 | 4/1975 | Hoffman | |
| 3,934,860 | 1/1976 | Michels et al. | |
| 4,029,824 | 6/1977 | Langen | |
| 4,036,122 | 7/1977 | Langen | |
| 4,038,426 | 7/1977 | Jespersen et al. | |
| 4,120,981 | 10/1978 | Burkhart | |
| 4,173,925 | 11/1979 | Leon | |
| 4,324,344 | 4/1982 | Kunz | 220/211 |
| 4,334,633 | 6/1982 | Piegza | 220/211 |

FOREIGN PATENT DOCUMENTS 1478830 7/1977 United Kingdom.

OTHER PUBLICATIONS

Meat Industry—The Massaging-Tumbling Revolution—Apr. 1977, Exhibit "E".
Meat Industry—Why Massage or Tumble—Nov. 1977—Exhibit "F".
Meat Industry—Ham Tumbling—Jun. 1978—Exhibit "F".

Primary Examiner—Robert W. Jenkins
Attorney, Agent, or Firm—Lyon & Lyon

[57] ABSTRACT

A door-operating mechanism for a rotatable drum which has a mouth to be closed by a door includes a moveable arm hingedly mounted with anchoring means on the side of the frame of the drum, and clamp means for connection with a stub shaft extending from the door. When the door is closed on the mouth of the drum, the clamp means is disengaged from the stub shaft so that the door is secured, under vacuum pressure within the drum, as an integral part of the rotating drum. Force is thus avoided on the hinged, moveable arm, and stub shaft of the door and door-operating mechanism. The clamp means includes jaws which are activated to release the door after a predetermined vacuum pressure exists within the drum. Energization of the jaws to engage the shaft is effected after the vacuum pressure has decreased to a predetermined level, the mechanism has moved a predetermined axial distance from the door and there has also been a predetermined time delay. Adjustment means are provided for moving the relative position of the door transversely and axially relative to the rotational axis of the drum. Lugs about the periphery of the door also facilitate alignment of the door with the mouth of the drum.

47 Claims, 4 Drawing Figures

DOOR-OPERATING MECHANISM

BACKGROUND

This invention relates to a door-operating mechanism. In particular, the invention is concerned with such a mechanism as applied to a door for a rotating drum in which products are processed. The processing of products in such rotatable drums usually is effected with the drum mounted on an axis inclined to the horizontal.

These drums normally have vanes or flights which can form a helical spiral on the inside wall of the drum for processing the products therein. Products processed in such drums include food pieces, in the forms of chunks of meat as is known in pending U.S. application Ser. No. 196,876, filed by Bruce Gould and assigned to the same assignee as this application; aggregate materials such as concrete, as illustrated in U.S. Pat. No. 3,175,811; or sheet materials in the form of hides, as is illustrated in U.S. Pat. No. 3,665,735. The disclosures in this application and the U.S. patents are incorporated by reference herein.

In U.S. application Ser. No. 196,876, there is disclosed a processor wherein an inclined drum includes a door for closing the mouth of the drum and through which a vacuum can be drawn in the drum. With such a vacuum, processing of the food products is enhanced. In this apparatus the door is mounted on a support structure which is part of the foundation supporting the drum. Despite the correct alignment of the drum and door when the apparatus is new, it has been found that due to wear, for instance, of the rollers on which the drum is supported or due to manufacturing tolerance characteristics, a misalignment can take place between the mouth of the drum and the door which is used to close the drum mouth.

As it is important for this closure to be tight, so as to enable a suitable vacuum to be drawn, it has been found that the operating characteristics of the drum of U.S. application Ser. No. 196,876 are not as efficient as desirable. In view of this misalignment undue stress is placed on the drum mounting mechanism, and particularly the hinge formation of the door operating mechanism which is an extended part of the structure from the foundation on which the drum rests.

In view of the above, there is a need to provide a door-operating mechanism wherein a moveable container and the door to the mouth of the container are permitted to be aligned so as to minimize the misalignment due to wear or otherwise normal manufacturing tolerances, and prevent deterioration of the hinged support mounting for the door, and other deleterious effect on the support means of the door operating mechanism. There is also a need to provide means for adjusting the relative position of the door with the drum, preferably in a facile manner, so that effective sealing of the door with the drum mouth can be achieved.

SUMMARY OF THE INVENTION

A door operating mechanism for a door to the mouth of a rotatable drum includes clamp means to releasably engage and disengage with a protruding shaft from the face of the door. There is an arcuately moveable arm mounted about anchoring means hinged on a support located adjacent the drum. The support is mounted on an extension of the foundation on which the rotating drum is mounted. The clamp means is mounted at the end of the moveable arm and is adapted to securely engage the door shaft until a predetermined vacuum pressure which is drawn in the drum, closed by the door, is reached. Release of the clamping means thereupon permits the door and drum to rotate integrally without imparting stress or force on the anchorage for the door.

When the vacuum is released and the pressure of the vacuum decreases towards atmosphere pressure, there is a movement effected by the arm axially relative to the rotating axis of the drum and away from the door. There is also a time delay prior to the clamp means again engaging the door shaft.

The mechanism includes a door swing cylinder for operating the moveable arm, and cylinders are provided for operating the clamping means. Vacuum sensing switches are operable with the cylinders and there is switching circuitry to effect a predetermined sequential operation of the cylinders of the mechanism relative to the vacuum pressure in the drum.

Adjustment bolts are provided about the hinged anchorage support so that the moveable means through its hinge pin can be adjusted transversely and axially relative the rotational axis of the drum. The door can thus be adjusted relative to the drum mouth to adapt for manufacturing tolerances and misalignment due to wear as the drum rotates on its foundation.

BRIEF DESCRIPTION OF DRAWINGS

FIG. 2 is a side view of the door-operating mechanism showing a partial view of the door, a door swing cylinder and piston for the moveable arm together with solenoid vacuum valves for operating the door swing cylinder and cylinders of the clamp means;

DETAILED DESCRIPTION OF THE DRAWINGS

Figure 1:
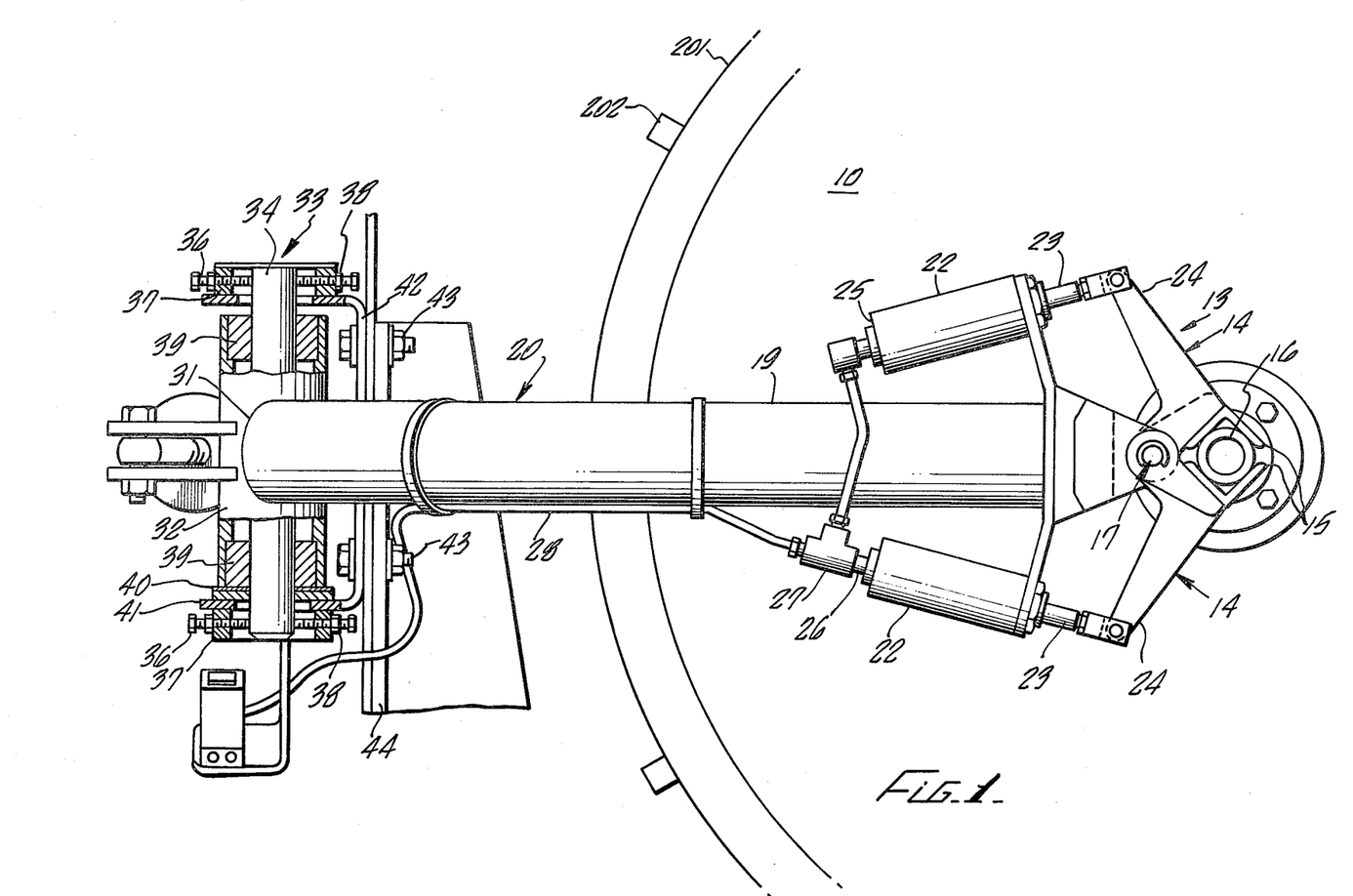
FIG. 1 is an end view of a door-operating mechanism for the door of a rotatable drum with portion of the hinged anchorage for the mechanism being shown in section, and also showing the cylinders for operating clamp means of the mechanism.
Figure 3:
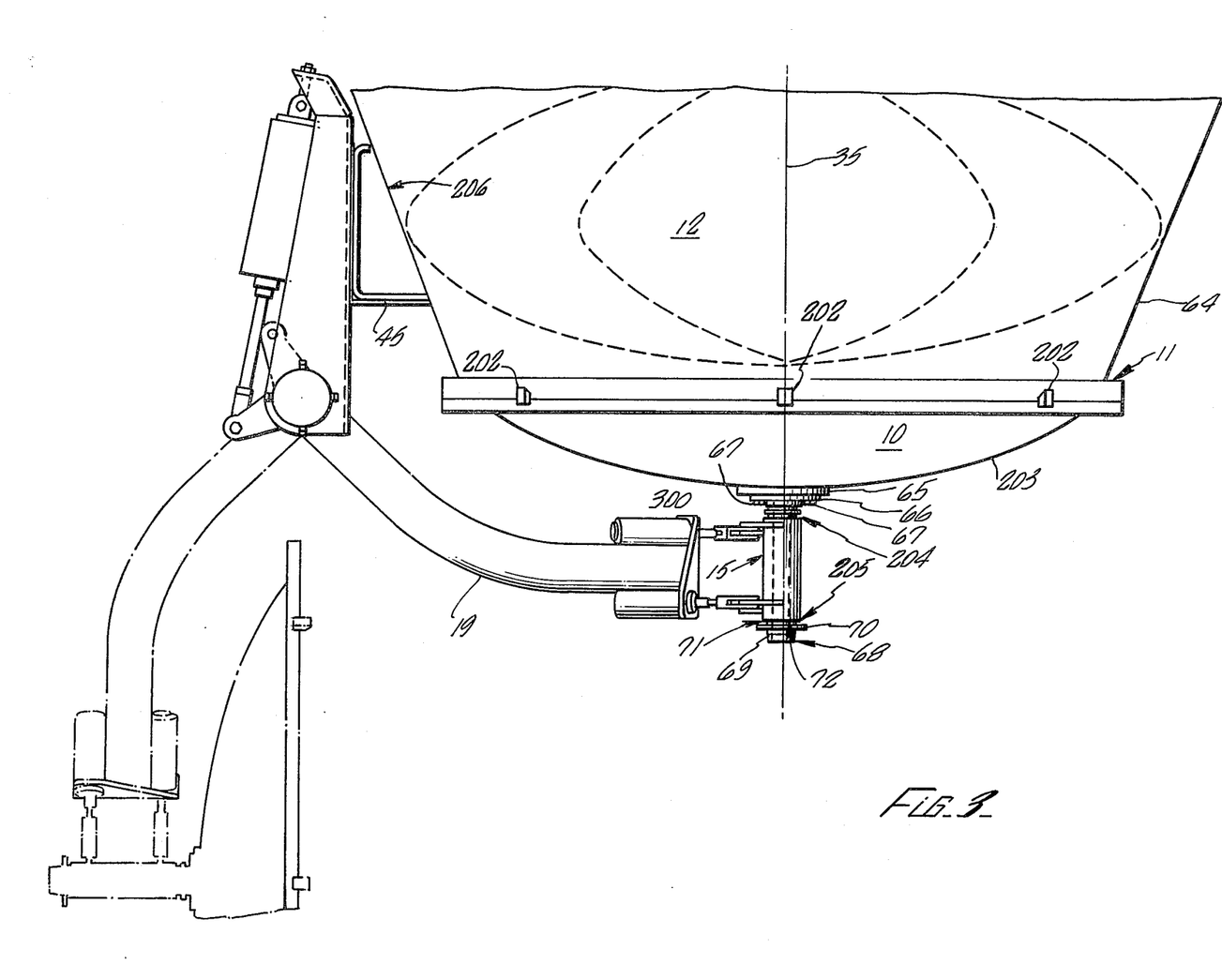
FIG. 3 is a top view of the door-operating mechanism illustrating portion of the rotating drum, the door in abutment over the mouth of the drum, the moveable arm, the door swing cylinder laterally located on the support means adjacent the rotating drum, and also showing in phantom lines the door in the open position.

A door-operating mechansim for a door 10 to the mouth 11 of a rotatable drum 12 includes clamp means 13. The clamp means includes a pair of levered elements 14 which each together define at their one end a pair of jaws 15. The jaws 15 are arranged to receive a hollow shaft 16 through which a vacuum can be drawn in the drum 12. Removed from the jaws 15, the lever elements 14 provide a common pivot point 17 with the end of an extension 18 remote to an arm 19 which is part of a moveable means 20 for moving the door 10 from a position closing the mouth 11 of the rotatable drum 12 to a position removed from the mouth 11.

Between the arm 19 and the extension 18, there is a mounting plate 21 on which a pair of pneumatic cylinders 22 are fixed. The ends of the cylinders 22 provide pistons 23 which are connected to free ends 24 of the lever elements 14. The opposite ends 25 of the cylinders 22 are connected with a pneumatic power source through hoses 26 which are connected to the T-piece 27. The hose 28 is connected to a pneumatic source through a solenoid valve 29 and a hose 30 as will be discussed in greater detail below.

The end 31 of arm 19 remote from the anchoring means 13 is secured to a tubular wall 32 forming a hinged anchorage means 33 for the door 10.

The tubular wall 32 is pivotally mounted about a central hinge pin 34 rotatable about an axis substantially rectilinear to the rotational axis 35 of the drum 12. The hinge pin 34 is held in position by means of two sets of four adjusting bolts 36 at the top and four adjusting bolts 36 at the bottom of the hinge pin 34. The bolts 36 are circumferentially spaced around the pin 34 at approximately ninety-degree intervals.

The bolts 36 are threaded in a circular support ring 37 and by adjusting nuts 38 the relative projection of bolts 36 into interior of wall 32 can be adjusted. The hinge pin 34 of the hinged anchorage means 33 can be moved transversely and axially relative to the rotational axis 35 of the drum 12. Thus, alignment of the door 10 relative to the mouth 11 of the drum 12 can be accurately effected and adjusted to account for manufacturing tolerances and wear during operation of the drum 12.

Wall 32 forms together with bushings 39, spacer plate 40, and thrust ring bearing 41 a composite housing for the hinged pivoted anchorage means 33. A bracket arm 42 is affixed by bolts 43 to a post 44 of the foundation means 45 for the door operating mechanism. This post 44 forms part of the foundation means 45 on which the rotatable drum 12 is mounted. Between the drum 12 and the foundation means 45 there are rollers and tracks on which the drum 12 can rotate.

Supported below the hinged anchorage assembly 33 there is provided a bracket 200 on which is mounted the solenoid valve 29 and a solenoid valve 46. Hose 47 is connneced through elbow member 48 to an open door port 49 of a door swing cylinder 50. Hose 51 is also connected with elbow 48 and is connected to a closed door port 52 of the door swing cylinder 50.

Bracket 42 provides an end wall 53 which is bored with an aperture to provide a shift 54 which is an extension to the end 55 of the door swing cylinder 50. The shaft 54 is mounted on lugs 56 affixed to the end 55. Nuts 57 to either side of the end wall 53 permit for the adjustment of the shaft 54 and hence the adjustment of the relative position of the door swing cylinder 50 in relation to the moveable arm 20. In this fashion, the effective degree of movement forward and rearward of the piston 58 is adjustable. Hereby the amount of movement or pressure of the door 10 on the mouth 11 of the drum 12 can be varied as required. The end of the piston 58 is provided with an eye 59 through which passes a bolt 60 to affix a pair of lugs 61 with the eye 59. The bolt 60 is affixed by means of a nut 62. The lugs 61 extend from the side wall 32 of the anchorage assembly 33 and as the piston 58 of the door swing cylinder 50 moves forwardly and rearwardly, the arm 19 is caused to move from the position wherein the door 10 is closed against the mouth 11 of the rotatable drum 12 of is removed from the mouth 11.

Around the perimeter 201 of the door 10, there are provided spaced lugs 202 which fit about the mouth 11 of the rotatable drum 12. These lugs 202 assist in aligning the door 10 with the mouth 11 such that if there has been undue wear or gross misalignment, interference will be encountered between the lugs 202 and the perimeter 201 of the outside of the wall 64 of the rotatable drum 12.

The hollow shaft 16 is affixed to the face 203 of the door 10 through a mounting plate 65 formed in the door face 203 substantially centrally about the rotational axis 35 of the rotatable drum 12. The end of the hollow shaft 16 for location on the mounting plate 65 provides a matching plate 66 which is suitably affixed by bolts 67 to the door face 203. The opposite end 68 of the hollow shaft 16 provides threads 69 for attachment of vacuum generating apparatus. Spaced inwardly of the threads 69, there is a collar 70 so that between another collar 300 on the stub shaft 16 and the collar 70 there is a defined space for accommodating the width of the jaws 15 between ends 204 and 205 of the lever elements 14 which effect anchorage with the door shaft 16. As illustrated in FIG. 3, it will seen that a small gap 71, measuring approximately one-quarter inch, exists between the end of collar 70 and the end portion 72 of the jaws 15. This gap 71 exists when the door 10 is closed about the mouth 11 and the arm 19 is extended in its furthest position as projected by the piston 58. In this position, the jaws 15 are in the position released or disengaged from the outside of the hollow shaft 16.

The operation of the door-operating mechanism together with the rotating drum is described with reference to the schematic of FIG. 4, which is the wiring diagram for operating the drum rotation, the vacuum pressure within the drum, and also the opening and closing of the door 10 through the moveable arm 19 and the operation of the clamp means 13.

At commencement of operation, the door 10 to the drum 12 is open and the drum 12 is loaded with products to be processed through the mouth 11 as required. The main operational timers of the circuit are now set, and here the overall timer 97 can be set to operate the rotational drum 12 for a period of, say, five hours. The auxiliary timer 99 regulates the amount of time that the drum 12 will rotate, and the auxiliary timer 100 the amount of time that the drum 12 will be stationary. These timers can be set, for instance, to one hour each.

Leads 73 and 74 are from a 120 volt AC power supply, and between lead 73 and the operational part of the circuitry there is a fuse 75. The main switch 76 between leads 73 and 74 can be set in the modes of manual (left position), off (central position), or automatic (right position). To start, the switch 76 is in the latter position, and power is applied on conductor 77 to the manual stop and start switches 78 and 79 wherein switch 79 is activated by pushing the closure button 79(a) to close terminals 80. Power is fed along line 81 through terminals 82 to the coil relay 83, which is then connected between leads 74 and 73. At this time, the contacts 84 are closed and simultaneously contacts 85 and 86 closed. Stop button 78(a) of switch 78 can be opened to break the contacts 207 and stop the operation of the circuit, should this be necessary.

With the main switch 76 closed on automatic, contact 208 is opened and contact 209 is closed. There is permitted a clamp release timer 232, and there is no energization of the clutch solenoid 92 in timer 232 because switch 90 is open. The clamp release solenoid 93 is also de-energized since there is no power across its terminals and hence the clamp elements 14 engage the shaft 16.

With power on line 81, there is also power on line 210 and with vacuum switch 88 closed, the vacuum solenoid valve 211 is energized through line 212. There is also power on line 213 which passes through the vacuum switch 95 which is closed when the vacuum is below 28 inches mercury. This, therefore, activates the vacuum pump motor starter 89 to commence generation of a vacuum.

Simultaneously, the closure of contact 209 of switch 76 puts power on line 214, which energizes the door swing solenoid valve 94 for the door swing cylinder 50. Energization of this valve causes the moveable arm 19 to start its arcuate movement to cause the door 10 to close on the mouth 11 of the container. The solenoid valve 94 in FIG. 4 is equivalent to the solenoid valve 46 in FIG. 2. The solenoid valve 93 of FIG. 4 is equivalent to the solenoid valve 29 of FIG. 2. Thus, the door 10 starts moving simultaneously with starting of the vacuum generating means as initiated by the vacuum pump motor starter 89.

Vacuum switch 90 is normally opened if the vacuum is less than 4 inches mercury. As soon as the vacuum exceeds this level, the switch closes and power is put on the clutch solenoid 215 of the timer 97. This also activates the motor 98 of timer 97 as contact 216 is closed. At this time also, contacts 217 and 218 move from the position shown in the drawing to contact, respectively, terminals 219 and 220.

This energizes the clamp release timer 232 and the switch 238 moves to contact terminal 221, thereby energizing the clamp release solenoid 93. The jaws 15 thereupon release from the shaft 16 and the door is held under vacuum on the mouth 11 of the drum 12. As such, the door 10 and drum 12 can rotate as an integral unit free from the jaws 15 of the clamp levers 14 of clamping means 13.

After timer 97 has run its time, contact 216 breaks and operation of motor 98 ends. Similarly, contacts 82 break and there is no power to the contact relay 83. At this time, contacts 84, 85, and 86 also open. Contact 218 remains in engagement with terminal 220 and thus there is power on line 81 and the right-hand side of the start button 79 of switch 78.

With contacts 82 open, the circuit of the vacuum pump motor starter 89 has no power and the vacuum generating pump stops. Similarly, there is no power on solenoid 211, and as this is de-energized a responsive valve permits air to enter the drum 12 through the hollow shaft 16.

When the vacuum pressure drops below 4 inches mercury, switch 90 opens and removes power from the timer solenoid 215 which opens contact 218 and 219 and thereby removes power from the door swing solenoid 94, which, being de-energized, moves to open the door 12. At this time, the jaw 15 moves to abutment with the collar 70 a distance of about ¼ inch, as explained earlier. Also at this time, the timer 232 is activated and after a one-second time delay, power to the clamp release solenoid 93 is removed and the clamp moves to engage the outside of the shaft 16. As soon as the vacuum within the drum 12 drops to a level substantially equal to atmospheric pressure, the door swings open by the pressure of the door swing cylinder 50.

Figure 4:
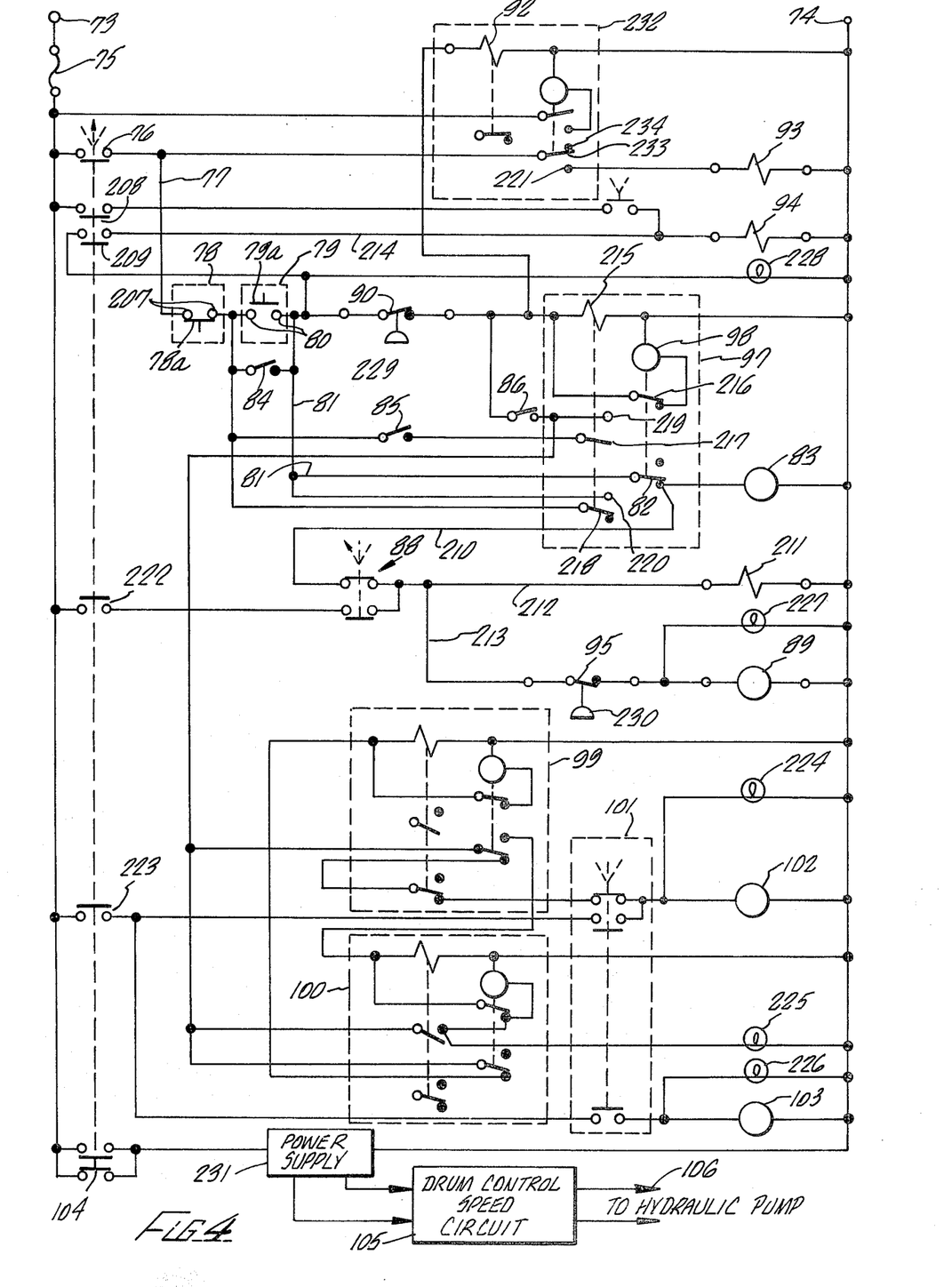
FIG. 4 is a schematic of the electrical wiring for operating the anchoring means, moveable means, clamp means, vacuum generating pump and drum rotation.
Figure 6:
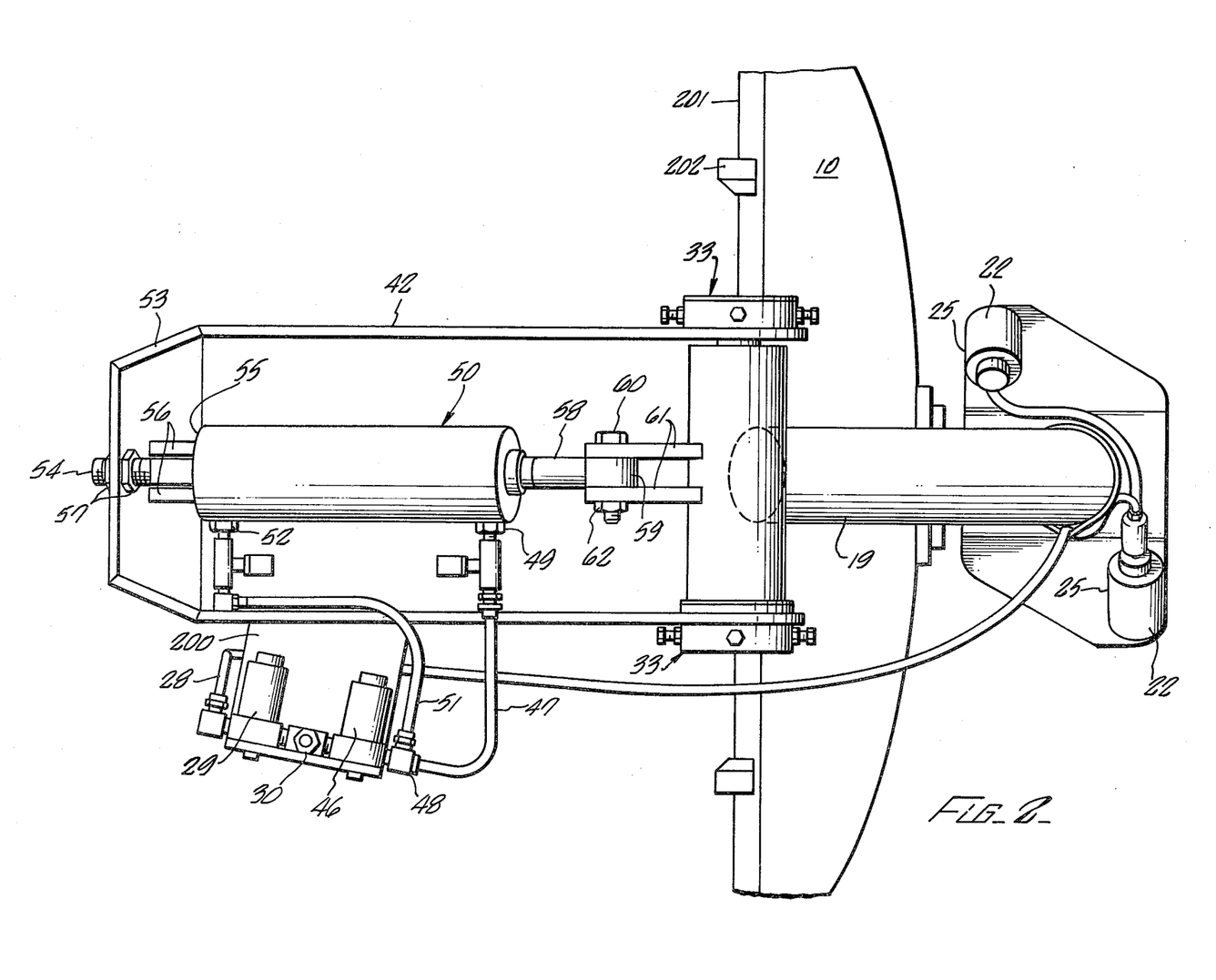

The various switches and contacts are all then in a position indicated in FIG. 4, which is the de-energized state of the schematic.

Switches 222 and 223, which operate together with the main switch 76, are safety switches operable with the manual mode of the processor as determined by switch 76 set to its left position. They act as isolating switches to prevent feedback currents when the circuitry is in automatic mode.

Lamps 224, 225, 256, 227, and 228 indicate the various states of operation of the processor, namely, forward running, stationary, reverse running, under vacuum, and in general processing mode. Switch 101 when set in the left-hand position permits the drum to rotate in reverse. In the right-hand position the drum 12 can rotate in the forward direction.

The vacuum switches 90 and 95 are connected through pressure-sensing terminals 229 and 230, respectively, to the vacuum pump and internal of drum 12 so as to be responsive to the various pressures within the drum.

The main switch 76 also operates contacts 104, which, in turn, activate speed control circuitry for the drum which is shown in block 105. The output 106 from the speed control circuitry activates a mechanical linkage of a hydraulic pump for rotating the drum 12. Power for circuitry 105 is obtained from a power supply 231 connected between leads 73 and 74 through the switch 104.

At commencement of operation of the door-activating mechanism, the jaws 15 are held fast with the hollow shaft 16 and the door is in an open position. After the drum 12 is loaded, the switch 76 is activated and the sequences described above follow. After the vacuum pressure within the drum 12, as generated through the vacuum pump, reaches the predetermined level of 4" Hg, the jaws 15 of the lever elements 14 are released from the shaft 16 by activation of the pistons 23 of the cylinders 22. The drum shaft 16 is now free to rotate as is the door 10 as a substantially integral unit together with the rotatable drum 12. In this fashion, the force, movement and vibration to the shaft 16 and hinge mechanism of the anchorage means 33 on the post 44 through arm 19 is minimized. Effective sealing of the drum through 11 and door 10 is maintained in this manner with the minimum of wear on the shaft 16 and hinge anchorage means 33. There is retained a residual pressure in the door swing cylinder 50 so that after release of the jaws 15 from the hollow shaft 16, the arm 19 swings slightly further inwardly towards the door face 203 under the residual pressure of the door swing cylinder 50. This creates the ¼ inch gap between the end 72 of jaws 15 and collar 70.

In case of failure of the vacuum within the rotatable drum 12, the collar 70 insures that the jaws 15 are retained about the hollow shaft 16 so that although the shaft 16 is not restricted from rotating, the collar 70 and jaws 15 do restrict the door shaft 16 and door 10 from separating inadvertently from the arm 19.

As the rotatable drum wears during operation, any necessary adjustment to the position of the door 10 relative to the rotatable drum 12 can be effected by movement of the adjusting bolts 36 on the anchorage means 33 so that the door can be moved transversely or axially relative to the rotatable axis 35.

When the processing is complete, the vacuum is released and at about 4" Hg the door swing piston 50 causes the arm 19 to swing and the end 72 of jaws 15 to engage the collar 70. After a one-second time delay, the cylinders 22 are activated to cause the jaws 15 to clamp about the hollow shaft 16 and when the pressure within the rotatable drum is reduced to substantially atmospheric, the arm 19 under the action of the drum swing piston 50 draws the door 10 from the rotatable drum mouth 11.

Between the door 10 and the mouth 11 of the drum, there is provided a O-ring seal to insure that effective sealing of the closed drum can be achieved. The drum 12 provides on the inside 206 of wall 64 helical vanes or flights which permit processing of the drum contents, which can be food pieces such as meat chunks. The axis 35 of drum 12 is in this embodiment of the invention inclined to the horizontal axis so that drum rotation is effected at an incline. The end of drum 12 remote from the mouth 11 is a closed end.

Although, in the embodiment of the invention described, shaft 16 is hollow and is used for vacuum to be drawn in the drum 12, it is possible in other embodiments for the stub shaft 16 to be solid and for a suitable vacuum for the drum 12 to be provided at an appropriate central point on the axis at the closed end of the drum. In place of a stub shaft 16 for receiving the clamp means 13 an alternative receiving means on the door can be provided for engagement by the clamp means 13. Further, although a time-delay feature of one second has been described between the movement of the jaws 15 abutting the collar 70 and the time of engagement of the jaws 15 with the shaft 16, it will be appreciated that different time intervals can be set according to different predetermined operating characteristics.

The described embodiment has been made with reference to a rotatable drum; however, it is clear that the door-operating mechanism can have application to other containers which move in different fashions and which are adapted to be closed by a door which has, in the past, been mounted with a rigid connection such that forces are set up in the door mounting or the sealing is impaired between the container and door due to movement of the container relative to the door. This causes undesirable forces on the mounting means and impairment of the sealing means, and with this invention those disadvantages can be minimized.

The present embodiments of this invention are to be considered in all respects as illustrative and not restrictive, the scope of the invention being indicated by the appended claims rather than the foregoing description, and all changes which come within the meaning and range of equivalency of the claims therefor are intended to be embraced therein.

I claim:

1. A door-operating mechanism for a door to the mouth of a moveable container, the container being mounted for movement on foundation means and the mechanism being adapted for mounting on support means in adjacent relationship with the foundation means, and wherein the operating mechanism comprises anchoring means, moveable means extending from the anchoring means, said moveable means being adapted for moving the door between a closed position with the mouth to the container and an opened position removed from the mouth, and clamp means between the door and the moveable means, the clamp means being adapted to release the moveable means from the door when the door is in the closed position with the mouth.

2. The door-operating mechanism as claimed in claim 1 wherein the moveable container is rotatable on the foundation means about an axis passing substantially centrally through the mouth of the container.

3. The door-operating mechanism as claimed in claim 2 wherein the support means is an extension from the foundation means.

4. The operating mechanism as claimed in claim 1 wherein the moveable means includes an arm, and the anchorage means is adapted to be hinged pivotally to the support means whereby the arm is adapted to move arcuately between a position wherein the door closes the container mouth and a position removed from the container mouth.

5. The door-operating mechanism as claimed in claim 4 wherein the rotational axis of the container passes centrally through the door when in the closed position, and the door includes a stub shaft extending axially from the door face along the rotational axis through the door, the clamp means releasably connecting the arm with the shaft.

6. The door-operating mechanism as claimed in claim 5 wherein the clamp means includes a pair of jaws for releasably clamping the shaft.

7. The door-operating mechanism as claimed in claim 1 including means for securing closure of the door with the container mouth when the door is closed with the mouth.

8. The door-support mechanism as claimed in claim 7 wherein the means for securing closure is vacuum generating means for the container, such generating means being connected to the inside of the container, and wherein generated vacuum pressure in the container holds the door on the mouth of the container.

9. The door-operating mechanism as claimed in claim 8 including a vacuum sensing switch and wherein the clamp means is ganged with the switch to cooperate such that on door closure the clamping means is adapted to release the door after the sensing switch senses a predetermined level of vacuum pressure.

10. The door-operating mechanism as claimed in claim 9 wherein a clamp means acts to engage the door after the sensing switch determines a vacuum pressure below a predetermined level.

11. The door-operating mechanism as claimed in claim 10 including time delay means, such means acting to cause a delay of a predetermined interval from the time of the reduction of the vacuum pressure below said predetermined level before permitting engagement of the door by the clamp means.

12. The door-operating mechanism as claimed in claim 10 including a vacuum sensing switch means, such means acting to permit a predetermined amount of movement of the moveable means and clamp means from the door prior to operation of the clamping means to engage the door.

13. The door-operating mechanism as claimed in claim 12 including stop means to limit the movement of the clamp means from the door.

14. The door-operating mechanism as claimed in claim 13 wherein there is a predetermined distance between the door and the stop means, such distance being larger than the width across the ends of the clamp means engaging the door whereby there is space for movement of the clamp means between the door and the stop means.

15. The door-operating mechanism as claimed in claim 7 wherein the moveable means includes a door swing cylinder operable under pressure to move the door between the position of closure and the position removed from the mouth.

16. The door-operating mechanism as claimed in claim 15 wherein the door swing cylinder for the moveable means is pneumatically operable, and the cylinder includes a moveable piston, the relative position of the cylinder being adjustable whereby the pressure of the door on closure with the container mouth is adjustable.

17. A door-operating mechanism for a door to the mouth of a rotatable drum, the drum being mounted for rotation on foundation means and the mechanism being mounted on support means in adjacent relationship with the drum, the drum being rotatable about an axis passing substantially through the center of the mouth and the door, the mouth for the drum being adapted to receive the door and thereby close the drum, the mechanism comprising clamp means for engaging the door, moveable means for moving the door between a position closing the mouth and a position removed from the mouth, anchorage means for mounting the moveable means on the support means, the clamp means being releasable from the door when the door is in closed position with the mouth, vacuum generating means for the drum for generating a vacuum pressure to the closed drum, vacuum sensing switch means for sensing a predetermined vacuum and releasing the clamp means, the door including a hollow shaft along the axis through which the vacuum generating means is adopted to be connected with the drum interior so that the vacuum can be drawn in the closed drum, and the clamp means being adapted to release and engage about the shaft on the door.

18. The door-operating mechanism as claimed in claim 17 wherein the shaft on the door includes a collar spaced from the face of the door and whereby the clamp means is moveable between the door face and the collar such that on engagement of the clamp means when the door is to be opened, the clamp means is in substantial abutment with the collar, and when the door is in the closed position the clamp means is in disengagement with the shaft and in substantial abutment with the door.

19. The door-operating mechanism as claimed in claim 18 wherein the clamp means includes a pair of spaced pneumatic cylinders, each cylinder having a moveable piston anchorable to a jaw for engagement with or release from the shaft.

20. The door-operating mechanism as claimed in claim 19 wherein both the jaws provide a single pivot point, such pivot point being related to the moveable means.

21. The door-operating mechanism as claimed in any one of claims 17 to 20 wherein the moveable means includes an arm pivotably mounted on a support means, the support means including hinge means, and the hinge means being adjustable, whereby the position of the arm and the door relative to the rotatable drum may be adjusted.

22. The door-operating mechanism as claimed in claim 21, including a series of adjusting bolts for moving the location of the hinge means transversely and axially relative to the rotational axis of the drum.

23. A moveable drum comprising foundation means for mounting the drum, a mouth to the drum, a door to close the mouth of the drum, the door being mounted on support means in adjacent relationship with the drum, a door operating mechanism for the door adapted to permit the door to move between a position closing the drum mouth and a position removed from the mouth, the operating mechanism including moveable means on the support means, and clamp means between the door and the moveable means, the clamp means being releasable from the door when the door is closed on the mouth so that the door and drum can move substantially freely together without force on the door-operating mechanism.

24. The drum as claimed in claim 23 wherein the moveable means includes a pivotable arm hingedly connected with the support means adjacent the drum, the arm being arcuately moveable between the position wherein the door is removed from the opening and a position wherein the door closes the mouth of the drum.

25. The drum as claimed in claim 24 wherein the door includes spaced lug means about its periphery, such lug means being adapted to be located about the mouth of the drum and thereby substantially align the door with the drum mouth.

26. The drum as claimed in either claim 24 or claim 25 wherein the pivotable arm is adjustable transversely and axially about its hinge relative to the rotatable axis of the drum.

27. The drum as claimed in claim 26 wherein the pivotable arm is actuated by a pneumatic door swing cylinder, a piston from the cylinder being adapted to move the arm and thereby the door between the open and closed positions.

28. The drum as claimed in claim 27 wherein the clamp means includes a pair of spaced pneumatic cylinders mounted on the arm, the cylinders having pistons and the forward ends of the pistons including a pair of jaw means adapted to be located about a hollow shaft through the door, the shaft permitting vacuum to be drawn in the drum when the door is closed.

29. The drum as claimed in claim 28 wherein the pair of jaw means is pivoted about a single pivot point, such pivot point being on an extension of the arm remote from the hinge.

30. The drum as claimed in claim 29 wherein the shaft includes collar means spaced from the door and the pair of jaws is permitted to move in a delineated space.

31. A processing drum mounted on a foundation for a rotation about an axis, the drum comprising a mouth and a door for the mouth, the door being mounted by moveable means to anchoring means, the moveable means being adapted to open and close the door with the mouth, the moveable means having clamp means for engaging or releasing the door from the moveable means, the door including a shaft through which a vacuum can be drawn to the closed drum, the clamp means being operable to engage the shaft when the door is in an open position, and when in closed position with the vacuum within the drum below a predetermined level, and being operable to disengage from the shaft when the vacuum is above said predetermined level such that the door and drum form an integral unit substantially free of the anchoring means and moveable means and the door can thereby rotate substantially freely with the drum.

32. The processing drum as claimed in claim 31 wherein the shaft includes a collar permitting a predetermined amount of axial movement of the clamp means relative to the drum, and wherein the collar prevents the clamp means removal from the drum shaft when the clamp means is in the released position.

33. The processing drum as claimed in claim 32 wherein the moveable means includes an arm pneumatically operable by door swing cylinder means between the closed position and open position and wherein the sequencing of opening and closure of the arm and opening and closure of the clamping means and the generation of said vacuum to the drum follows a predetermined sequence.

34. The processing drum as claimed in claim 33 wherein the door swing cylinder means is adapted, on closure of the door on the mouth and release of the clamp means from the shaft, to move further towards the door.

35. The processing drum as claimed in either claim 33 or claim 34 wherein the door swing cylinder includes an adjustable mounting means thereby to permit adjustment of the door pressure relative to the drum mouth.

36. The drum as claimed in either claim 31, 32 or 33 wherein the inside of the drum includes spiral flight means to effect processing.

37. The drum as claimed in claim 36 wherein the drum is adapted for the processing of food pieces.

38. The drum as claimed in claim 37 wherein the food pieces include chunks of meat.

39. A food processing drum comprising
    (a) a rotatable drum having a side wall, a closed end to the drum and a mouth to feed food pieces into the drum, the mouth being opposite the closed end,
    (b) foundation means for the drum to permit drum rotation about a longitudinal axis extending between the closed end and the mouth at an incline to the horizontal,
    (c) flight means mounted on the inside of the side wall of the drum for processing food during drum rotation,
    (d) a door for the mouth and a door-operating mechanism, and,
    (e) support means adjacent the drum mouth for mounting anchoring means for the door-operating mechanism,
    (f) the anchoring means including a hinged mounting and there being a pivotal arm affixed to the anchoring means, the end of the pivotal arm remote from the hinged mounting including clamp means, and the clamp means being releasably connectable with the door.

40. A drum as claimed in claim 39 including vacuum generating means for the drum, the vacuum being generated when the door is closed, and the clamp means releasing the door when a predetermined vacuum is generated in the drum.

41. A drum as claimed in claim 40 wherein the moveable means includes a door swing cylinder, such cylinder operating the door between closure and opening, and the clamp means including pneumatic cylinder means to effect engagement and release sequentially with the door in a predetermined relationship.

42. A method of operating a rotatable processing drum through a mouth to the drum with the desired material for processing, activating a door-operating mechanism mounted on support means in adjacent relationship with the drum, to move a door to close the mouth of the drum, releasing the door-operating mechanism from the door whereby the drum and the door are adapted to rotate as an integral unit substantially free of the door operating mechanism, and wherein prior to releasing the door from the door-operating mechanism a vacuum is drawn in the closed drum to secure the door with the drum, and further wherein the door is opened by releasing the vacuum in the drum, activating the operating mechanism to move a predetermined amount from the door, energizing the door-operating mechanism to engage the door, and activating the door operating mechanism to move the door from the mouth of the drum.

43. A method as claimed in claim 42 wherein prior to releasing the door from the door-operating mechanism a vacuum is drawn in the closed drum to secure the door with the drum.

44. A method as claimed in claim 43 wherein the door is opened by releasing the vacuum in the drum, activating the operating mechanism to move a predetermined amount from the door, energizing the door-operating mechanism to engage the door, and activating the door operating mechanism to move the door from the mouth of the drum.

45. A method as claimed in claim 42 including delaying energization of the door-operating mechansim for a predetermined time after the vacuum pressure has fallen to a predetermined level.

46. A method as claimed in any one of claims 42 or 45 wherein the material being processed is food constituents.

47. A method as claimed in claim 46 wherein the food constituents include chunks of meat.

* * * * *